United States Patent
Ayandeh (10) Patent No.: US 8,750,311 B2
(45) Date of Patent: Jun. 10, 2014

(54) FIBRE CHANNEL HOST VIRTUALIZATION

(75) Inventor: Siamack Ayandeh, Concord, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 13/557,986

(22) Filed: Jul. 25, 2012

(65) Prior Publication Data

US 2014/0029608 A1    Jan. 30, 2014

(51) Int. Cl.
*H04L 12/28* (2006.01)
*H04L 12/54* (2013.01)
*H04L 12/56* (2006.01)
*H04L 29/08* (2006.01)

(52) U.S. Cl.
CPC ............ *H04L 12/56* (2013.01); *H04L 49/357* (2013.01); *H04L 67/1097* (2013.01)
USPC ............ 370/392; 370/252; 370/389; 370/401

(58) Field of Classification Search
USPC ................... 370/252, 389, 401, 392
See application file for complete search history.

(56) References Cited

U.S. PATENT DOCUMENTS

| | | | |
|---|---|---|---|
| 7,907,626 B2 | 3/2011 | Saklecha et al. | |
| 7,990,975 B1 | 8/2011 | Dropps et al. | |
| 8,041,987 B2 | 10/2011 | Allen et al. | |
| 2007/0140236 A1* | 6/2007 | Parthasarathy et al. | 370/389 |
| 2007/0147267 A1* | 6/2007 | Holland | 370/252 |
| 2009/0307378 A1 | 12/2009 | Allen et al. | |
| 2010/0232450 A1* | 9/2010 | Maveli et al. | 370/419 |
| 2010/0232793 A1* | 9/2010 | Atkinson | 398/45 |
| 2012/0054850 A1 | 3/2012 | Bhardwaj et al. | |
| 2013/0117481 A1* | 5/2013 | Allen et al. | 710/105 |

OTHER PUBLICATIONS

N-port Virtualization in the Data Center, Cisco MDS 9000 NX-OS and SAN-OS Software, download date May 21, 2012. <http://www.cisco.com/en/US/prod/collateral/ps4159/ps6409/ps5989/ps9898/white_paper_c11-459263.html>.

* cited by examiner

*Primary Examiner* — Duc C Ho (57) ABSTRACT

A method for fiber channel (FC) host virtualization includes determining a virtual N_Port identification (ID) that is assigned and used by a host to route a frame from the host to a switch of a FC storage area network (SAN) fabric, and determining a FC SAN fabric based location N_Port ID that is assigned by the FC SAN fabric to the host to route the frame within the FC SAN fabric. The method further includes mapping, by a processor, the host assigned virtual N_Port ID to the FC SAN fabric based location N_Port ID.

15 Claims, 6 Drawing Sheets

FIBRE CHANNEL HOST VIRTUALIZATION

BACKGROUND

Fibre channel (FC) switch ports can be used by hosts and targets to login to a switch in a storage area network (SAN) fabric. The SAN fabric typically includes a collection of switches that share a database. The SAN fabric can be of the form of a native FC fabric or a FC over Ethernet (FCoE) fabric. When a host logs in to a SAN fabric, the host login process is driven by the switch and FC SAN fabric. Characteristics of the host, such as a host address, are typically defined during the login process by the FC SAN fabric. These aspects of FC operation can impact virtualization of the host and virtual machine mobility.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In a storage area network (SAN), fiber channel (FC) switch ports can be used by hosts and targets (e.g., storage devices) to login to a switch that is part of the SAN. A FC host login process is driven by the switch and FC SAN fabric. During the FC host login process, characteristics of a host, such as a host address, are defined by the FC SAN fabric or by the FC switch and switch port to which the host is connected. For a frame that is transmitted from a host to a target, the host address is used by the FC SAN fabric to route the frame from ingress into the FC SAN fabric to egress from the FC SAN fabric.

For example, when a host or target (i.e., a N_Port or VN_Port) goes through a process of fabric login with a first hop FC switch, the host is assigned a N_Port ID. The designation N_Port is used in the context of a native FC fabric and the designation VN_Port is used in the context of a FC over Ethernet (FCoE) fabric. The designation N_Port is used to identify a port on a host or storage device. The designation F_Port is used to identify a port on a switch that connects to a N_Port. The N_Port ID is used to identify the host or target (e.g., storage device) during frame transmissions. In order to support host virtualization and virtual machine mobility (e.g., virtual host mobility), a port profile is often used. Host parameters, such as the definition of the port profile, are host driven.

A FC host virtualization apparatus and method are described herein and provide a port profile that defines the parameters of a virtual machine independently from a SAN fabric. The FC host virtualization apparatus and method provide an initiator and target driven model of operation when defining host parameters.

The FC host virtualization apparatus and method use a virtual N_Port ID to identify a N_Port or VN_Port, which provides an initiator and target driven approach to address allocation. The virtual address space is independent of the FC fabric address space. The virtual N_Port ID is assigned by the N_Port or VN_Port. Further, a FC SAN fabric based location N_Port ID is assigned at the F_Port of an edge switch per the logged in N_Port. At ingress, the virtual N_Port ID is mapped to the FC SAN fabric based location N_Port ID. At egress, the FC SAN fabric based location N_Port ID is mapped to the virtual N_Port ID. Mapping of the FC SAN fabric based location N_Port ID and the virtual N_Port ID may be performed by address rewrite in a frame in transit or by an outer encapsulation. A virtualization manager and database may be used to assign the virtual N_Port ID, which provides an initiator and target driven approach to address assignment. The initiator and target driven approach also provides for decoupling of the way virtual machines (e.g., virtual hosts) are substantiated and the way the FC SAN fabric operates. The virtual N_Port ID may also be used to enforce access control lists (ACLs), for example, at an edge switch of the FC SAN fabric.

The FC host virtualization apparatus and method provide for zoning rules to be defined in a virtualization manager and database, which provides for a host configuration that is independent of a network configuration. For example, the virtual N_Port ID may be used in a zone server for enforcing soft and hard zoning rules. The use of the virtual N_Port ID in a zone server provides a host configuration that is independent of the FC SAN fabric configuration. In addition to or instead of packet filtering rules for FCs using the world wide name of a N_Port or VN_Port to identify a rule and the N_Port ID to enforce the rule, zoning rules may be defined in a virtualization manager and database. This allows for control of packet filtering to be handled outside of the FC SAN fabric.

The FC SAN fabric is also extended to hosts in the form of virtual switches (vSwitch). The use of the virtual N_Port ID also provides for migration of packet filtering to a soft switch within a host (i.e., a vSwitch), in order to control visibility of resources (e.g., storage devices) to a given virtual host or virtual machine. This approach allows for zoning to be enforced at the source of a frame as part of a vSwitch using virtual addresses.

Figure 1:
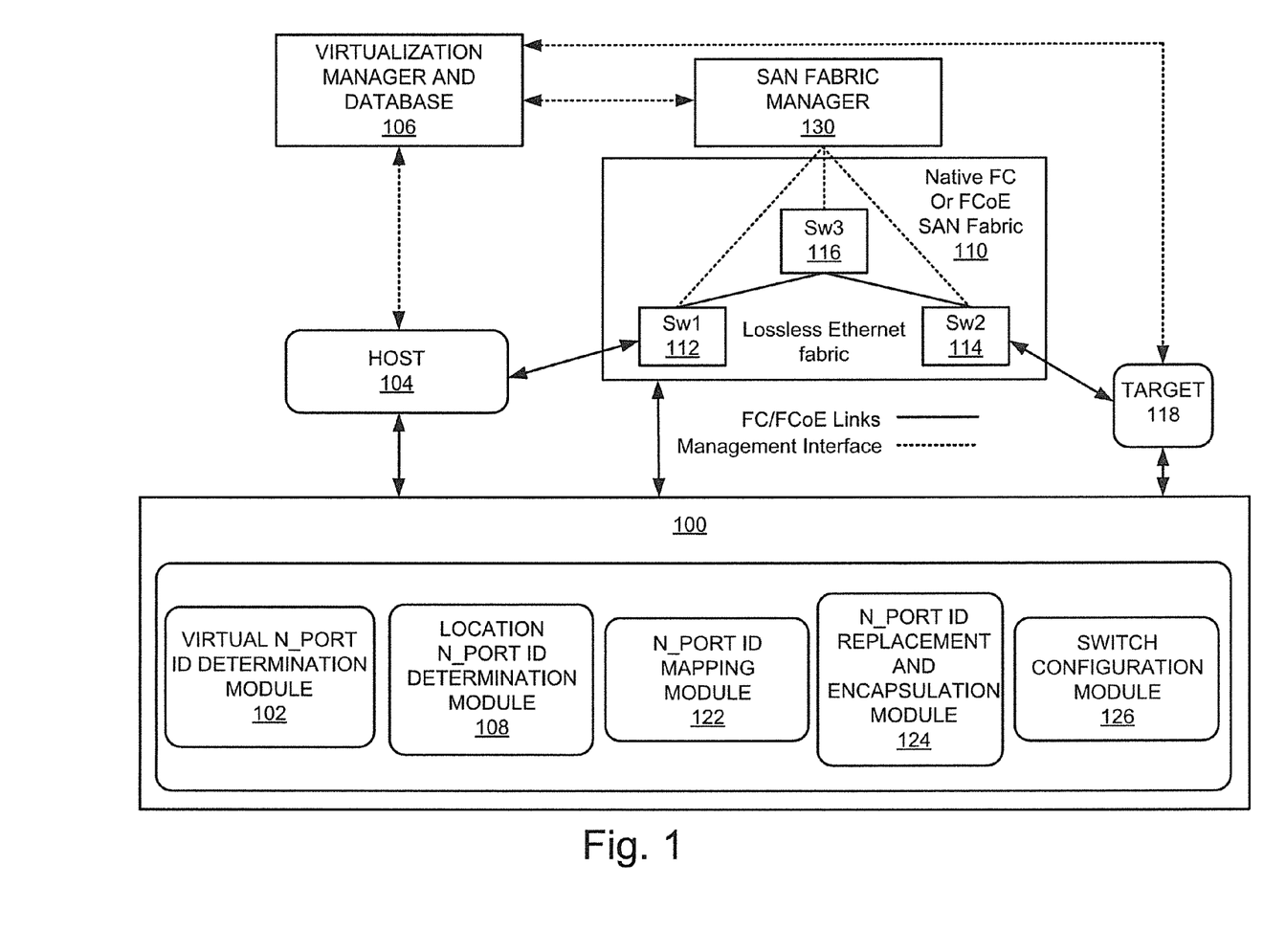
FIG. 1 illustrates an architecture of a fiber channel (FC) host virtualization apparatus, according to an example of the present disclosure.

FIG. 1 illustrates an architecture of a FC host virtualization apparatus 100, according to an example. Referring to FIG. 1, the apparatus 100 is depicted as including a virtual N_Port identification (i.e., N_Port ID) determination module 102 that is to determine a virtual N_Port ID that is assigned and controlled (i.e., used) by a host 104 and a virtualization manager and database 106. A location N_Port ID determination module 108 is to determine a FC SAN fabric based location N_Port ID that is assigned by a FC SAN fabric 110 to the host 104. The FC SAN fabric 110 may include FC switches Sw1, Sw2 and Sw3 respectively at 112, 114 and 116. For the FC SAN fabric 110, FC switch ports for the FC switches Sw1 and Sw2 may be used by the host 104 and a target 118 to login to one of the FC switches Sw1 or Sw2. The FC SAN fabric 110 may use the virtualization manager and database 106 that maintains a port profile that carries the N_Port (i.e., for native FC fabric) or VN_Port (i.e., for FCoE fabric) characteristics including a virtual N_Port ID. A N_Port ID mapping module 122 is to map the host assigned virtual N_Port ID to the FC SAN fabric based location N_Port ID. At ingress to the FC SAN fabric 110, a N_Port ID replacement and encapsulation module 124 is to replace the host assigned virtual N_Port ID with the FC SAN fabric based location N_Port ID. Further, at egress from the FC SAN fabric 110, the N_Port ID replacement and encapsulation module 124 is to replace the FC SAN fabric based location N_Port ID with the host assigned virtual N_Port ID. Alternatively, instead of replacing the host assigned virtual N_Port ID with the FC SAN fabric based location N_Port ID, the N_Port ID replacement and encapsulation module 124 is to add a layer of encapsulation to any frames routed from a source to a destination switch port. A switch configuration module 126 is to configure edge switches (e.g., FC switches Sw1, Sw2) with access control lists (ACLs) to filter unauthorized communication with the FC SAN fabric 110. A SAN fabric manager 130 manages assignment of a domain_ID portion of the location N_port_IDs for the FC SAN fabric 110.

The modules 102, 108, 122, 124, and 126, and other components of the apparatus 100 may comprise machine readable instructions stored on a computer readable medium. In addition, or alternatively, the modules 102, 108, 122, 124, and 126, and other components of the apparatus 100 may comprise hardware or a combination of machine readable instructions and hardware.

The virtual N_Port ID determination module 102 determines a virtual N_Port ID that is assigned and controlled (i.e., used) by the host 104 and the virtualization manager and database 106. The virtual N_Port ID is a virtual address used to route a frame from the host 104 to a switch (e.g., FC switches Sw1 and Sw2) of the FC SAN fabric 110.

The location N_Port ID determination module 108 determines a FC SAN fabric based location N_Port ID that is assigned by the FC SAN fabric 110 to the host 104. The FC SAN fabric 110 may be a native FC fabric or a FC over Ethernet (FCoE) fabric. The FC SAN fabric 110 may include the FC switches Sw1, Sw2, and Sw3 respectively at 112, 114, and 116. The FC switch ports of the FC switches may be denoted F_Ports if the FC SAN fabric 110 is a native FC fabric, and VF_Ports if the FC SAN fabric 110 is a FCoE fabric. For the FC SAN fabric 110, the FC switch ports may be used by the host 104 and the target 118 to login to a switch (e.g., FC switches Sw1, Sw2 and Sw3). Likewise, the FC switch ports may be used by a plurality of hosts and targets to login to a switch. The host 104 and the target 118 may communicate over the FC SAN fabric 110 via the FC switches Sw1, Sw2 and Sw3.

Figure 2:
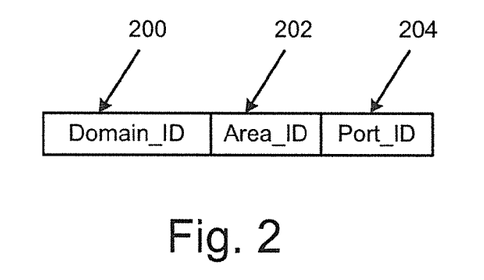
FIG. 2 illustrates an example of a N_Port ID address format, according to an example of the present disclosure.

Referring to FIGS. 1 and 2, the virtual N_Port ID and location N_Port ID may be formatted to include a domain_ID at 200, an area_ID at 202 and a port_ID at 204. The virtual N_Port ID is assigned and controlled by the host 104 and the virtualization manager and database 106. For the virtual N_Port ID, the domain_ID is used for routing frames from the host 104 to a switch port of the FC SAN fabric 110. For the virtual N_Port ID, the area ID may be a physical port number, and the port ID may represent a virtual port on a physical port. The location N_Port ID is drawn from a pool of IDs which is specific to a switch and switch port as well as the FC SAN fabric of which the switch is a part of. Each switch is assigned a domain_ID which is unique within the FC SAN fabric. This domain_ID is used for routing frames from a source to a destination switch port within the FC SAN fabric 110. For the location N_Port ID, the area ID may be a physical port number, and the port ID may represent a virtual port on a physical port.

Addresses may also be assigned by allowing the host 104 to provide an address as part of its fabric login (FLOGI) process. The host 104 can offer a virtual address as part of its FLOGI. A switch may then assign a location N_Port ID and establish a mapping between the virtual address offered by the host 104 and the location N_Port ID as part of the FLOGI. The mapping is further reported to the SAN fabric manager 130. Virtual hosts may thus operate using virtual addresses while the FC SAN fabric 110 operates using the location N_Port ID.

For a frame received with an unknown virtual N_port_ID, a query to the SAN fabric manager 130 by a switch can be used to determine the mapping between the virtual N_port_ID and the location N_port_ID. This is performed as part of a port login (PLOGI) process, which follows a FLOGI process.

Figure 3A:
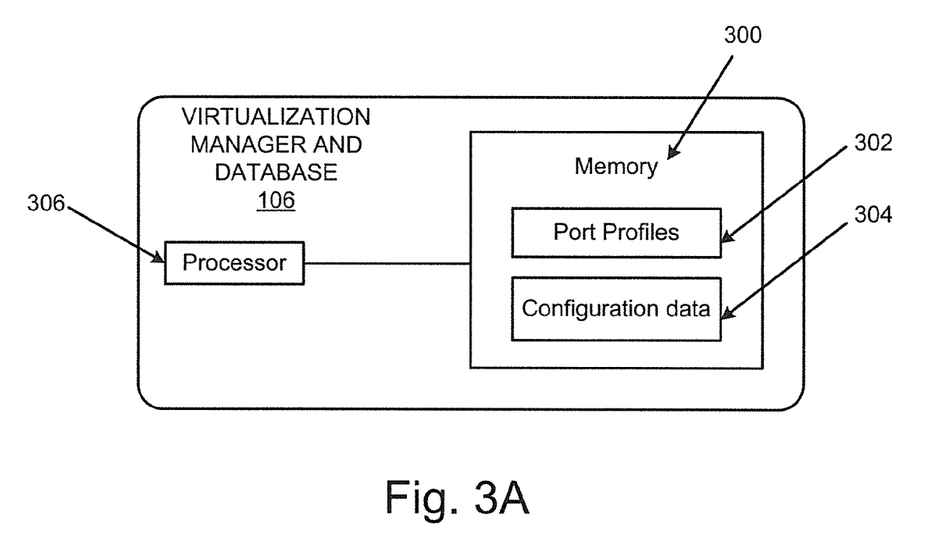
FIG. 3A illustrates an example of a virtualization manager and database, according to an example of the present disclosure.

Referring to FIGS. 1 and 3A, the virtualization manager and database 106 maintains port profiles that carry all the virtual host (i.e., machine) characteristics including virtual N_Port IDs. The port profiles thus define the configuration of initiator (i.e., the host 104) and the target 118 virtual N_Port IDs. The virtualization manager and database 106 may maintain the port profiles for a plurality of hosts to thus allow virtualization of the plurality of hosts that share a physical switch port of the FC SAN fabric 110 (when an encapsulation technique is used). The virtualization manager and database 106 may include a memory 300 including port profiles 302 and configuration data 304. The configuration data 304 may include information such as which port is allowed to communicate with another port, a status of a port (i.e., up/down), or characteristics of ports. The virtualization manager and database 106 may also include a processor 306 to execute functions associated with the memory 300, the port profiles 302, and the configuration data 304.

Figure 3B:
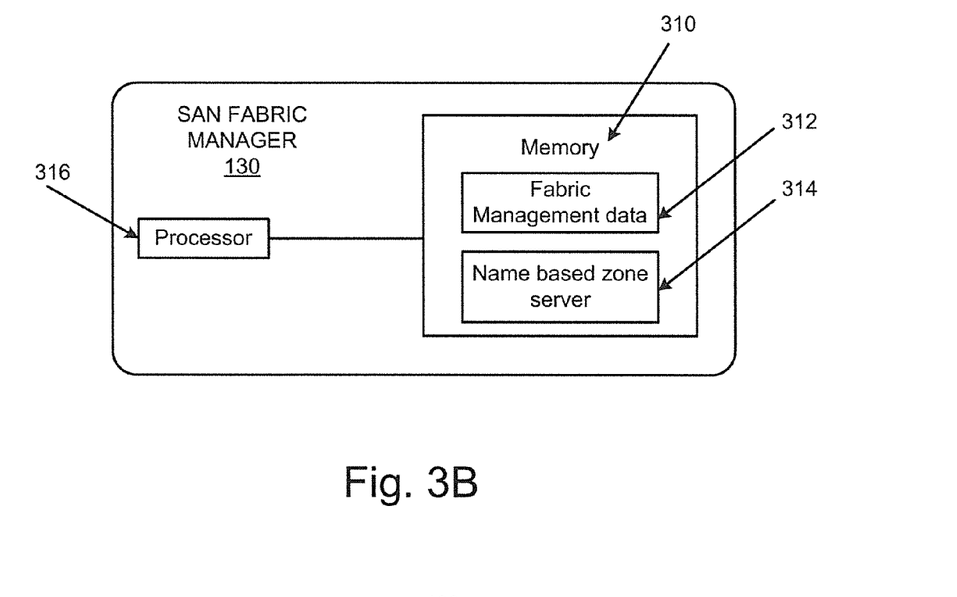
FIG. 3B illustrates an example of a SAN fabric manager, according to an example of the present disclosure.

Referring to FIGS. 1 and 3B, the SAN fabric manager 130 may include a memory 310 including fabric management data 312 and a name based zone server 304. The zone sever defines the rules that permit or deny communications between end points. The SAN fabric manager 130 may also include a processor 316 to execute functions associated with the memory 310, the fabric management data 312 including, for example, domain IDs, and correspondence between names of endpoints and addresses, and the name based zone server 304 including, for example, names of endpoints and switches.

The FC host virtualization apparatus 100 uses the port profiles 302 from the virtualization manager and database 106 as part of a login process. For example, during a login process, the F_Port on an edge switch (e.g., switch Sw1 at 112 and switch Sw2 at 114) assigns the location N_Port ID to the host 104 or target 118. In communication between the host 104 and the switch Sw1 at 112, or the target 118 and the switch Sw2 at 114, the host assigned virtual N_Port ID is used. For example, the virtual N_Port ID is used by the host 104 and the target 118 as part of a FLOGI request sent to the F_Ports on the edge switches Sw1 at 112 and Sw2 at 114.

However, in communications beyond the F_Port on an edge switch, the edge switch (e.g., switch Sw1 at 112 or switch Sw2 at 114) rewrites the virtual N_Port ID address field with the location N_Port ID. Alternatively, the rewrite may be performed by the N_Port ID replacement and encapsulation module 124 as described herein. All fabric routing is based on the location N_Port ID. End points (e.g., hosts, switches etc.) may also be identified by name identifiers that are used for management purposes and address identifiers (e.g., virtual N_Port IDs) which are used during ingress to and egress from the FC SAN fabric 110, and location N_Port IDs, which are used for traversing the FC SAN fabric 110.

Figure 4:
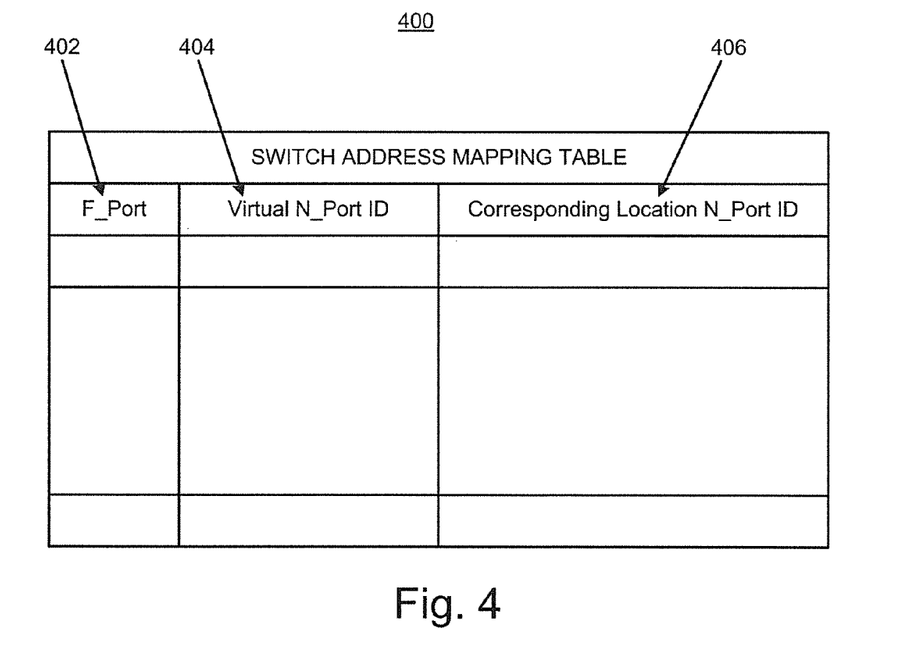
FIG. 4 illustrates an example of a switch address mapping table, according to an example of the present disclosure.

The N_Port ID mapping module 122 maps the host assigned virtual N_Port ID to the FC SAN fabric based location N_Port ID. The mapping of the host assigned virtual N_Port ID to the FC SAN fabric based location N_Port ID occurs during login to the FC SAN fabric 110. The mapping of the host assigned virtual N_Port ID to the FC SAN fabric based location N_Port ID also decouples the way the host 104 operates from the way the FC SAN fabric 110 operates. The N_Port ID mapping module 122 may also map a plurality of host assigned virtual N_Port IDs to the FC SAN fabric based location N_Port ID, which provides for scaling of addresses. Referring to FIG. 4, the mapping may be facilitated by using a switch address mapping table 400. The switch address mapping table 400 may include a F_Port column 402, a virtual N_Port ID column 404 and a corresponding location N_Port ID column 406. The N_Port ID mapping module 122 may also be provided as a component of the edge switches Sw1 at 112 and Sw2 at 114.

At ingress to the FC SAN fabric 110, the N_Port ID replacement and encapsulation module 124 replaces the host assigned virtual N_Port ID with the FC SAN fabric based location N_Port ID, and vice versa at egress. The replacement of the host assigned virtual N_Port ID with the FC SAN fabric based location N_Port ID may be performed by a rewrite of a header of a frame being transmitted. Alternatively, instead of replacing the host assigned virtual N_Port ID with the FC SAN fabric based location N_Port ID, the N_Port ID replacement and encapsulation module 124 adds a layer of encapsulation to any frame routed from a source to a destination switch port. For example, a layer of encapsulation may be added to a frame routed from a source to a destination switch port such that the host assigned virtual N_Port ID is carried in the frame and accompanied by an outer encapsulation layer including the FC SAN fabric based location N_Port ID. If encapsulation is used, technologies other than FC may be used. For example, technologies such as native FC, or FCoE may be used.

Once the host assigned virtual N_Port ID is replaced with the FC SAN fabric based location N_Port ID or a layer of encapsulation is added to a frame, FC services also include the virtual N_Port ID. For example, registered state change notifications (RSCNs), which allow a host (e.g., the host 104) to discover other nodes (e.g., other hosts and devices) attached to the FC SAN fabric 110 and discover the parameters of a newly logged in host, will include the virtual N_Port ID.

The switch configuration module 126 configures edge switches (e.g., switch Sw1 at 112 and switch Sw2 at 114) with ACLs to filter unauthorized communication with the FC SAN fabric 110. The ACLs may be configured using the host assigned virtual N_Port ID or the FC SAN fabric based location N_Port ID. The virtual N_Port ID may also be used to enforce access control ACLs, for example, at an edge switch. Therefore, a fabric zone server also includes the mapping of the host assigned virtual N_Port ID to the FC SAN fabric based location N_Port ID. Communication rules provided by the ACLs may therefore be enforced based on an incoming frame including the host assigned virtual N_Port ID or the FC SAN fabric based location N_Port ID.

The virtual N_Port ID may be used in a fabric zone server for enforcing soft and hard zoning rules. For example, the virtual N_Port ID may be used in a fabric zone server for enforcing soft zoning rules by providing communication options to the host 104 and hard zoning rules by allowing frames that meet the communication options provided to the host 104. The use of the virtual N_Port ID in a zone server provides a host configuration that is independent of the network FC fabric configuration. For example, FC zoning is the partitioning of a FC fabric (e.g., FC SAN fabric 110) into smaller subsets to restrict interference, add security, and to simplify management. Zoning may be defined using both the name and statically assigned addresses of end points, such as hosts, and targets.

The use of the virtual N_Port ID also provides for migration of packet filtering to a soft switch within a host (i.e., a vSwitch), in order to control visibility of resources (e.g., storage resources) to a given virtual host or virtual machine. This approach allows for zoning to be enforced at the source of a frame as part of a vSwitch. For example, zoning rules can be enforced using the virtual N_Port IDs. The virtualization manager and database 106 provides the interface to configure the zoning rules and create a zoning database. Given a small number of hosts, filtering rules may be assigned statically. If the number of rules becomes large, rules may be dynamically assigned as N_Ports become active through a FLOGI process. The interface between the SAN fabric manager 130 and the virtualization manager and database 106 can provide information on activation of end points, at which point the virtualization manager and database 106 can install and activate the filtering rules. Enforcing zoning within a vSwitch can provide separation between tenants that are the users of virtual resources and an infrastructure provider. For example, multiple tenants may share an infrastructure (e.g., multiple virtual machines on a host). Each tenant can then define zoning rules which are specific to the tenant network. The infrastructure provider can ensure that each tenant receives access to the permitted physical resources using network based zoning.

Figure 5:
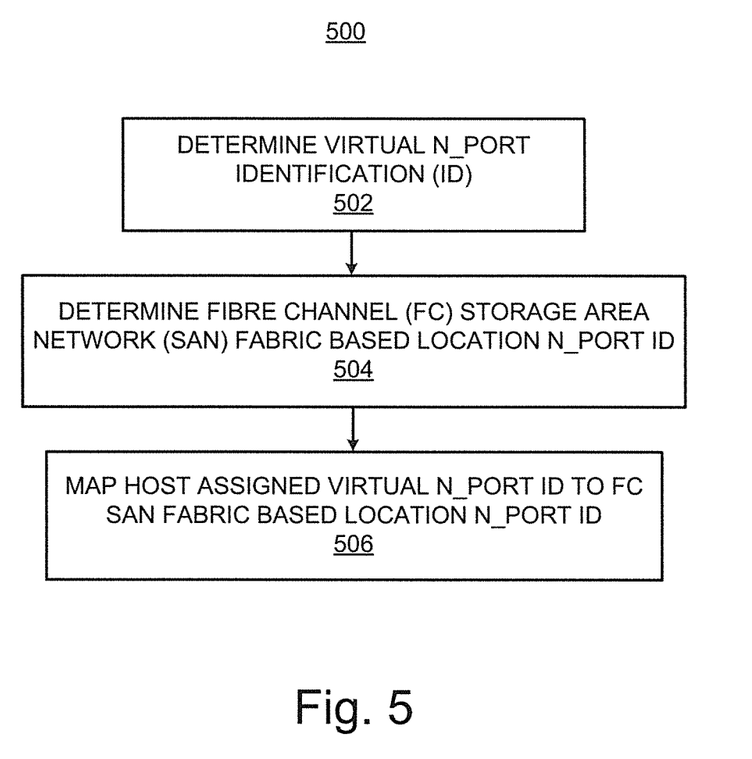
FIG. 5 illustrates a method for FC host virtualization, according to an example of the present disclosure.
Figure 6:
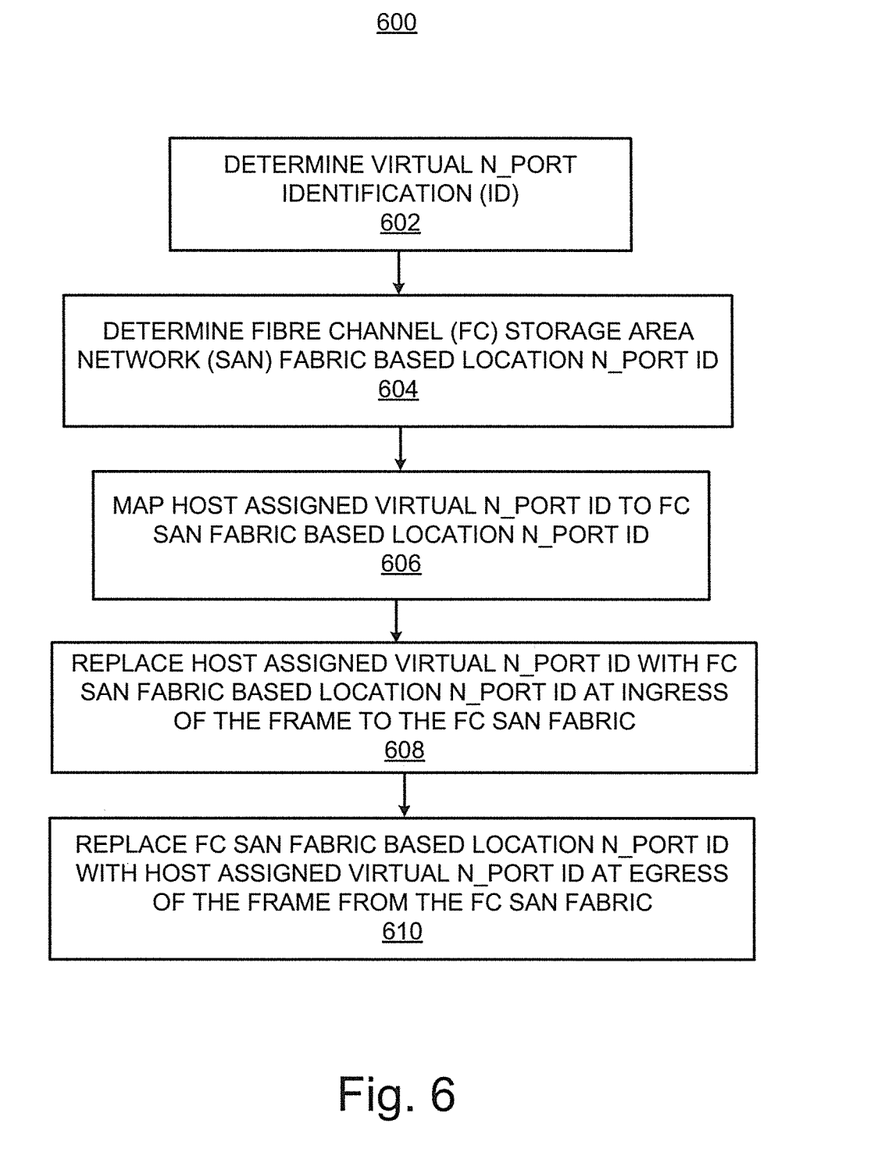
FIG. 6 illustrates further details of the method for FC host virtualization, according to an example of the present disclosure.

FIGS. 5 and 6 illustrate flowcharts of methods 500 and 600 for FC host virtualization, corresponding to the example of a FC host virtualization apparatus 100 whose construction is described in detail above. The methods 500 and 600 may be implemented on the FC host virtualization apparatus 100 with reference to FIG. 1 by way of example and not limitation. The methods 500 and 600 may be practiced in other apparatus.

Referring to FIG. 5, for the method 500, at block 502, a virtual N_Port ID that is assigned and used by a host to route a frame from the host to a switch of a FC SAN fabric is determined. For example, referring to FIG. 1, the virtual N_Port ID determination module 102 determines a virtual N_Port ID that is assigned and controlled by the host 104 and the virtualization manager and database 106 to route a frame from the host 104 to a switch of the FC SAN fabric 110.

At block 504, a FC SAN fabric based location N_Port ID that is assigned by the FC SAN fabric to the host to route the frame within the FC SAN fabric is determined. For example, referring to FIG. 1, the location N_Port ID determination module 108 determines a FC SAN fabric based location N_Port ID that is assigned by the FC SAN fabric 110 to the host 104 to route the frame within the FC SAN fabric 110.

At block 506, the host assigned virtual N_Port ID is mapped to the FC SAN fabric based location N_Port ID. For example, referring to FIG. 1, the N_Port ID mapping module 122 maps the host assigned virtual N_Port ID to the FC SAN fabric based location N_Port ID.

Referring to FIG. 6, for the method 600, at block 602, a virtual N_Port ID that is assigned and used by a host to route a frame from the host to a switch of a FC SAN fabric is determined. The virtual N_Port ID may be obtained from a virtualization manager and database associated with the FC SAN fabric. For example, referring to FIG. 1, the virtual N_Port ID may be obtained from the virtualization manager and database 106 associated with the FC SAN fabric 110.

At block 604, a FC SAN fabric based location N_Port ID that is assigned by the FC SAN fabric to the host to route the frame within the FC SAN fabric is determined.

At block 606, the host assigned virtual N_Port ID is mapped to the FC SAN fabric based location N_Port ID.

At block 608, the host assigned virtual N_Port ID is replaced with the FC SAN fabric based location N_Port ID at ingress of the frame to the FC SAN fabric. For example, referring to FIG. 1, at ingress to the FC SAN fabric 110, the N_Port ID replacement and encapsulation module 124 replaces the host assigned virtual N_Port ID with the FC SAN fabric based location N_Port ID.

At block 610, the FC SAN fabric based location N_Port ID is replaced with the host assigned virtual N_Port ID at egress of the frame from the FC SAN fabric. For example, referring to FIG. 1, at egress from the FC SAN fabric, the N_Port ID replacement and encapsulation module 124 replaces the FC SAN fabric based location N_Port ID with the host assigned virtual N_Port ID. Alternatively, instead of replacing the host assigned virtual N_Port ID with the FC SAN fabric based location N_Port ID, the N_Port ID replacement and encapsulation module 124 adds a layer of encapsulation to the frame at ingress of the frame to the FC SAN fabric 110 such that the host assigned virtual N_Port ID is carried in the frame and includes an outer encapsulation layer including the FC SAN fabric based location N_Port ID, and removes the layer of encapsulation (i.e., decapsulation) from the frame at egress of the frame from the FC SAN fabric 110. Further, edge switches of the FC SAN fabric are configured with ACLs to filter unauthorized communication with the FC SAN fabric. The virtual N_Port ID is used in a zone server to enforce zoning rules. Further, packet filtering may be migrated to a soft switch in the host to control visibility of storage resources to the host.

Figure 7:
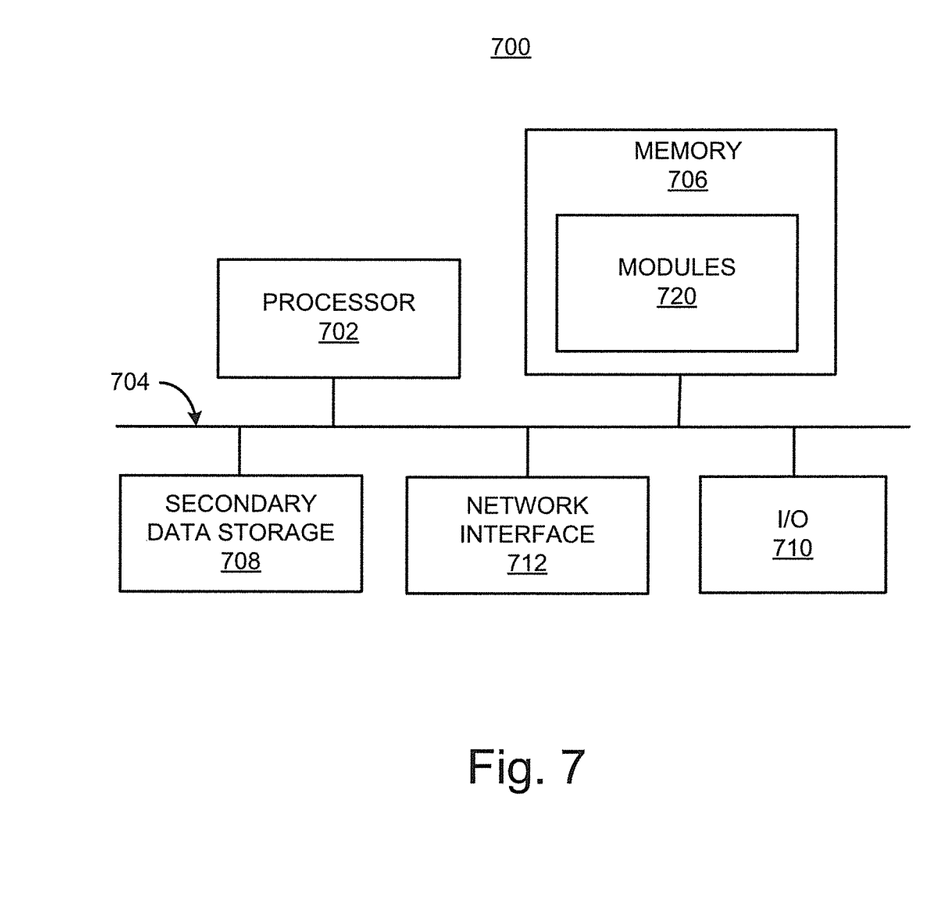
FIG. 7 illustrates a computer system, according to an example of the present disclosure.

FIG. 7 shows a computer system that may be used with the examples described herein. The computer system represents a generic platform that includes components that may be in a server or another computer system. The computer system may be used as a platform for the apparatus 100. The computer system may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system includes a processor 702 that may implement or execute machine readable instructions performing some or all of the methods, functions and other processes described herein. Commands and data from the processor 702 are communicated over a communication bus 704. The computer system also includes a main memory 706, such as a random access memory (RAM), where the machine readable instructions and data for the processor 702 may reside during runtime, and a secondary data storage 708, which may be non-volatile and stores machine readable instructions and data. The memory and data storage are examples of computer readable mediums. The memory 706 may include modules 720 including machine readable instructions residing in the memory 706 during runtime and executed by the processor 702. The modules 720 may include the modules 102, 108, 122, 124, and 126 of the apparatus shown in FIG. 1.

The computer system may include an I/O device 710, such as a keyboard, a mouse, a display, etc. The computer system may include a network interface 712 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for fiber channel (FC) host virtualization, the method comprising:
   determining a virtual N_Port identification (ID) that is assigned and used by a host to route a frame from the host to a switch of a FC storage area network (SAN) fabric;
   determining a FC SAN fabric based location N_Port ID that is assigned by the FC SAN fabric to the host to route the frame within the FC SAN fabric; and
   mapping, by a processor, the host assigned virtual N_Port ID to the FC SAN fabric based location N_Port ID.

2. The method of claim 1, wherein the FC SAN fabric is one of:
   a native FC fabric, and a FC over Ethernet fabric (FCoE).

3. The method of claim 1, further comprising:
   obtaining the virtual N_Port ID from a virtualization manager and database associated with the FC SAN fabric.

4. The method of claim 1, further comprising:
   replacing the host assigned virtual N_Port ID with the FC SAN fabric based location N_Port ID at ingress of the frame to the FC SAN fabric.

5. The method of claim 4, further comprising:
   replacing the FC SAN fabric based location N_Port ID with the host assigned virtual N_Port ID at egress of the frame from the FC SAN fabric.

6. The method of claim 1, further comprising:
   adding a layer of encapsulation to the frame at ingress of the frame to the FC SAN fabric such that the host assigned virtual N_Port ID is carried in the frame and includes an outer encapsulation layer including the FC SAN fabric based location N_Port ID.

7. The method of claim 6, further comprising:
   removing the layer of encapsulation from the frame at egress of the frame from the FC SAN fabric.

8. The method of claim 1, further comprising:
   configuring edge switches of the FC SAN fabric with access control lists (ACLs) to filter unauthorized communication with the FC SAN fabric.

9. The method of claim 1, further comprising:
   using the virtual N_Port ID in a fabric zone server to enforce zoning rules.

10. The method of claim 1, further comprising:
    migrating packet filtering to a soft switch in the host to control visibility of storage resources to the host.

11. The method of claim 1, further comprising:
mapping a plurality of host assigned virtual N_Port IDs to the FC SAN fabric based location N_Port ID when using encapsulation.

12. A fiber channel (FC) host virtualization apparatus comprising:
a memory storing a module comprising machine readable instructions to:
  determine a virtual N_Port identification (ID) that is assigned and used by a host to route a frame from the host to a switch of a FC storage area network (SAN) fabric;
  determine a FC SAN fabric based location N_Port ID that is assigned by the FC SAN fabric to the host to route the frame within the FC SAN fabric;
  map the host assigned virtual N_Port ID to the FC SAN fabric based location N_Port ID; and
  one of:
    replace the host assigned virtual N_Port ID with the FC SAN fabric based location N_Port ID at ingress of the frame to the FC SAN fabric, and replace the FC SAN fabric based location N_Port ID with the host assigned virtual N_Port ID at egress of the frame from the FC SAN fabric, and
    add a layer of encapsulation to the frame at ingress of the frame to the FC SAN fabric such that the host assigned virtual N_Port ID is carried in the frame and includes an outer encapsulation layer including the FC SAN fabric based location N_Port ID, and remove the layer of encapsulation from the frame at egress of the frame from the FC SAN fabric; and
a processor to implement the module.

13. The apparatus of claim 12, further comprising machine readable instructions to:
obtain the virtual N_Port ID from a virtualization manager and database associated with the FC SAN fabric.

14. The apparatus of claim 11, wherein the FC SAN fabric is one of:
a native FC fabric, and a FC over Ethernet fabric (FCoE).

15. A non-transitory computer readable medium having stored thereon machine readable instructions for fiber channel (FC) host virtualization, the machine readable instructions when executed cause a computer system to:
  assign a virtual N_Port identification (ID) that is used by a host to route a frame from the host to a switch of a FC storage area network (SAN) fabric;
  assign a FC SAN fabric based location N_Port ID to the host to route the frame within the FC SAN fabric; and
  map, by a processor, the virtual N_Port ID to the location N_Port ID.

* * * * *